(No Model.)
M. PLUMMER.
FENCE MACHINE.
No. 594,649.   Patented Nov. 30, 1897.
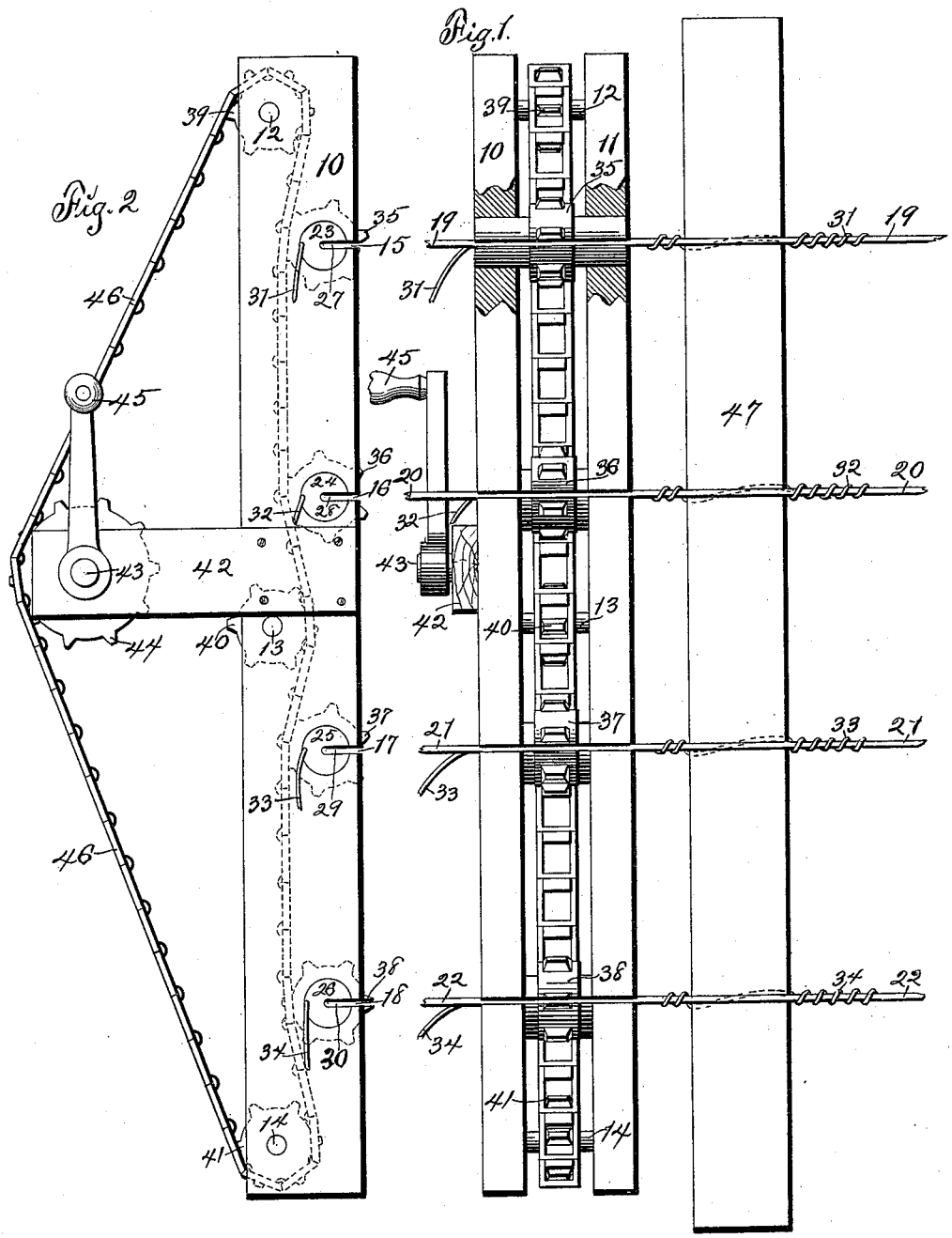
Attest:
Jas. Darels.
S. C. Sweet.
Mark Plummer,
Inventor,
by Henry D. O'Brien,
Atty.

UNITED STATES PATENT OFFICE.

MARK PLUMMER, OF MINERAL SPRINGS, MISSOURI.

FENCE-MACHINE.

SPECIFICATION forming part of Letters Patent No. 594,649, dated November 30, 1897.

Application filed July 19, 1897. Serial No. 645,075. (No model.)

*To all whom it may concern:*

Be it known that I, MARK PLUMMER, a citizen of the United States, residing at Mineral Springs, in the county of Barry and State of Missouri, have invented certain new and useful Improvements in Fence-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

The object of this invention is to provide improved means for combining strand-wires and tie-wires in a fence in such a manner as to confine and retain slats, pickets, or stays transversely of the strand-wire.

This invention consists in the construction of a device or mechanism arranged to be positioned by lateral movement upon suspended fence-wires and operated to twist tie-wires upon said fence-wires, as hereinafter set forth, pointed out in my claim, and illustrated by the accompanying drawings, in which—

Figure 1 is an elevation of a fence, showing my machine, partly in section, mounted thereon. Fig. 2 is a view transversely of Fig. 1.

In the construction of the device as shown the numerals 10 11 designate side pieces of approximately the same size and shape, which are located in parallel positions and connected by shafts 12, 13, and 14, stationarily positioned transversely thereof. The side pieces 10 11 are provided with notches 15, 16, 17, and 18 in their forward edges, which notches are of such width as to permit the passage therethrough of strand-wires 19, 20, 21, and 22, which strand-wires preferably are fixed in approximately horizontal positions to fence-posts. (Not shown.)

Mounted for revolution in the side pieces 10 11 are winding-hubs 23, 24, 25, and 26, which winding-hubs are provided with radial slots 27, 28, 29, and 30 of like width to and registering at times with the slots 15, 16, 17, and 18 of the side pieces. Each of the winding-hubs is provided with a slot or groove transversely of that portion of its periphery opposite to the slots 27, 28, 29, and 30 to receive one or another of the tie-wires 31, 32, 33, and 34. Sprocket-wheels 35, 36, 37, and 38 are mounted rigidly on the winding-hubs 23, 24, 25, and 26 and are radially slotted in communication with the slots 27, 28, 29, and 30 of the hubs. Sprocket-wheels 39, 40, and 41 are mounted loosely on the shafts 12, 13, and 14 in staggered relations to a plane common to the axes of the winding-hubs. A bracket 42 is fixed to and projects rearwardly from the side piece 10 of the machine, and a crank-shaft 43, mounted for rotation in the outer end of said bracket, is provided with a sprocket-wheel 44 opposite to the sprocket-wheels heretofore mentioned. The crank-shaft 43 is provided with a hand-crank 45, whereby it may be rotated manually.

In practical operation my machine is mounted on the strands 19, 20, 21, and 22 by movement transversely of the strands in such a manner that the strands enter the notches 15, 16, 17, 18, 27, 28, 29, and 30 to the centers of the hubs 23 24 25 26. I then insert tie-wires 31 32 33 34 in the opposite grooves, slots, or notches of the hubs, either by stringing them or by rotating the hubs until said notches or grooves correspond with the notches 15, 16, 17, and 18 and inserting the tie-wires by lateral movement therein. Then by holding the ends of the tie-wires against the strand-wires and rotating the crank-shaft 43 manually I rotate the sprocket-wheels 39, 41, and 44, the sprocket-wheel 44 driving the chain 46 to rotate the other sprocket-wheels and revolve the winding-hubs. The sprocket-wheel 40, which may be duplicated any desired number of times in the length of the chain 46, serves to hold the chain in engagement with the sprocket-wheels 35, 36, 37, and 38. In the rotation of the sprocket-wheels and winding-hubs thereto affixed the tie-wires are carried around and coiled upon the strand-wires, as shown at the right of the picket 47 in Fig. 1. I then move the machine longitudinally of the strand-wires and insert a picket vertically between the strand-wires and the tie-wires and then operate the machine, as before described, successively to produce the coils shown at the left of the picket 47 in Fig. 1.

By so constructing and arranging the several parts of the machine as to take the machine from the strand-wires and replace it by lateral movement I gain a material advantage, especially in repairing fence, by replacing broken pickets or putting occasional stays on a fence not otherwise provided with them.

I claim as my invention—

A fence-machine comprising the following elements in combination, to wit, the side pieces 10, 11 with marginal notches 15, 16, 17 and 18 in their forward edges; winding-hubs 23, 24, 25 and 26 mounted for revolution in the side pieces and provided with radial slots 27, 28, 29 and 30 arranged to register at times with the notches in the side pieces, the winding-hubs also being provided with grooves transversely of their peripheries opposite to the radial slots therein to receive tie-wires; the sprocket-wheels 35, 36, 37 and 38 rigidly mounted on the winding-hubs and radially slotted in communication with the radial slots in the hubs; the shafts 12, 13 and 14 stationarily positioned in the side pieces in staggered relations to a plane common to the axes of the winding-hubs; the sprocket-wheels 39, 40 and 41 mounted for revolution on said shafts; a bracket 42 fixed to and projecting rearwardly from the side piece 10; the crank-shaft 43 mounted for rotation in the outer end of said bracket; the sprocket-wheel 44 mounted rigidly on said crank-shaft; and the sprocket-chain 46 mounted for travel on and in engagement with the peripheries of the several sprocket-wheels, as set forth.

In testimony whereof I affix my signature in presence of two witnesses.

MARK PLUMMER.

Witnesses:
B. T. COPPEDGE,
GEO. E. HARRIS.